(12) United States Patent
Kim

(10) Patent No.: US 7,484,696 B2
(45) Date of Patent: Feb. 3, 2009

(54) PIPE FIXING SYSTEM

(76) Inventor: Sukyoon Kim, 1-802 AJU Apartment, 374 Galsan2, Bupyeong, Incheon (KR)

( * ) Notice: Subject to any disclaimer, the term of this patent is extended or adjusted under 35 U.S.C. 154(b) by 167 days.

(21) Appl. No.: 11/573,772

(22) PCT Filed: Aug. 16, 2005

(86) PCT No.: PCT/KR2005/002657

§ 371 (c)(1),
(2), (4) Date: Feb. 15, 2007

(87) PCT Pub. No.: WO2006/019238

PCT Pub. Date: Feb. 23, 2006

(65) Prior Publication Data

US 2007/0272805 A1    Nov. 29, 2007

(30) Foreign Application Priority Data

Aug. 16, 2004    (KR) .................. 10-2004-0064162

(51) Int. Cl.
*F16L 3/00*    (2006.01)
(52) U.S. Cl. .................. 248/49; 248/65; 248/74.1; 248/519; 138/89; 138/96 R
(58) Field of Classification Search .................. 248/519, 248/74.1, 49, 65; 138/89, 90, 96 R
See application file for complete search history.

(56) References Cited

U.S. PATENT DOCUMENTS 4,657,425 A * 4/1987 Takahashi .................. 403/104
4,936,544 A * 6/1990 Bartholomew ........... 251/149.6
5,676,174 A   10/1997 Berneski, Jr. et al.

FOREIGN PATENT DOCUMENTS

| JP | 02-240492 | 9/1990 |
| JP | 06-281074 | 10/1994 |
| JP | 2003-106490 | 4/2003 |

* cited by examiner

*Primary Examiner*—Amy J. Sterling
(74) *Attorney, Agent, or Firm*—IPLA P.A.; James E. Bame

(57) ABSTRACT

The present invention discloses a pipe fixing system that can provide generally uniform elasticity to a plurality of jaws movably disposed along the tapered inner peripheral surface at the inside of a body thereof, thus making a pipe fixed in a more rigid way. The pipe fixing system comprises a body 10, a plurality of jaws 20 in such a manner as to be moved toward an inlet 13 of the body 10, a jaw-coupling cylindrical plate spring member 30 mounted at the inside of the body 10 in such a manner as to be supported at the lower end thereof by the inner bottom surface of the body 10. The jaw-coupling cylindrical plate spring member 30 has a plurality of cut lines 32 formed vertically from distance from the lower end thereof to the middle portion thereof in such a manner as to be equally spaced at relatively narrow intervals in a circumferential direction, a plurality of elastic piece parts 33 each formed of a plate-like shape and each disposed between the two adjacent cut lines 32 in such a manner as to be bent outwardly to provide an elastic force toward the upper portion thereof, and a plurality of coupling holes 34 formed on the upper side of the plurality of elastic piece parts 33 for inserting the plurality of jaws 20 thereinto such that the plurality of jaws 20 are kept at a horizontal level.

10 Claims, 11 Drawing Sheets

PIPE FIXING SYSTEM

TECHNICAL FIELD

The present invention relates to a pipe fixing system, and more particularly, to a pipe fixing system that can provide generally uniform elasticity to a plurality of jaws movably disposed along the tapered inner peripheral surface at the inside of a body thereof, thus making a pipe fixed in a more rigid way.

BACKGROUND ART

In general, a typical method of fixing a pipe on the ground or connecting pipes with each other is welding.

However, such the welding method has a disadvantage in that the pipe and the auxiliary members used for fixing the pipe may be all deformed due to the welding heat generated unavoidably at the time of carrying out the thermal fusion.

In addition, the process of carrying out the welding is somewhat complicated, and at the state of finishing the process, it is also found that the horizontal or vertical level of the pipe is not constant, which requires great carefulness in the process.

Moreover, in order to remove the welded pipe, the welding tools are used again or a saw is needed, such that it has disadvantages in that the pipe is not recycled and it requires lots of time and manpower for fixing and removing the pipe structure.

Instead of the welding method, therefore, there are provided another method of fixedly connecting the pipes.

The methods according to the prior arts are disclosed in Japanese Patent Laid-open Publication No. Hei 6-281074 and Korean Utility Model Registration No. 20-0204053, and Korean Utility Model Registration No. 20-0242197.

According to the prior arts, a plurality of jaws are compressed in a central direction with respect to a pipe, while moving to the outside direction thereof by means of a coil spring, which makes the pipe pressurized thus to fix the pipe.

Also, the plurality of jaws are inserted into a jaw coupling which is adapted to be moved to the outside direction by means of the coil spring, such that the jaws press the pipe thus to fix the pipe.

In this case, the plurality of jaws should be arranged horizontally along the outer peripheral surface of the pipe thus to compress the pipe, which can make the pipe rigidly fixed.

In the prior arts, however, the plurality of jaws are not horizontally arranged, which results in the failure of rigidly fixing the pipe.

The reason why fixing the pipe is not achieved is that the coil spring provides different elasticity to the plurality of jaws.

It is generally known that an average compression (elasticity) value for the coil spring formed by winding a spring steel wire several times in a circumferential direction with respect to the pipe is obtained, which exhibits different elasticity values at respective positions around the circumference of the pipe.

In the prior arts where the coil spring is employed, therefore, the spring elasticity values acting with respect to the jaws are different to make the moving distances of the jaws different from one another, such that the jaws are not arranged in a horizontal relation with respect to one another, thus to fail to rigidly fix the pipe.

Additionally, if the pipe after fixing is to be removed, it is forcedly rotated in left and right directions.

In this case, since the jaws are not rotated at the time of rotating the pipe, the outer peripheral surface of the pipe is worn out by the friction against the toothed portions of the jaws.

Thus, the gap between the pipe and the jaws is formed such that if the pipe is pulled forcedly, it is undesirably removed. Moreover, the outer peripheral surface of the pipe is damaged, such that the pipe can be not used again.

Therefore, a novel pipe fixing system, which can provide a generally uniform elasticity value of the coil spring to a plurality of jaws such that the jaws are moved at the same distance, is proposed by the same applicant as the present invention in Korean Utility Model Registration Nos. 20-0269752, 20-0269760, and 20-0347218.

In the prior arts as described above, however, the pipe fixing systems, which are operated to move the jaws through the elasticity of the coil spring thus to compress the pipe, have a disadvantage in that it is difficulty to manufacture the coil spring with the uniform elasticity in large quantities.

This accompanies the problems that products do not have uniform quality and thus, bad products may be made.

DISCLOSURE OF INVENTION

Technical Problem

Accordingly, the present inventor has been made to solve the above-described problems occurring in the prior art, and it is an object of the present invention to provide a pipe fixing system that can provide generally uniform elasticity to a plurality of jaws movably disposed along the tapered inner peripheral surface at the inside of a body thereof, thus making a pipe fixed in a more rigid way.

Another object of the present invention is to provide a pipe fixing system that can be not damaged or removed at all, even though a pipe after fixing is forcedly turned.

A further object of the present invention is to provide a pipe fixing system that can be manufactured in a simple manner, thus to prevent production costs from being raised.

Technical Solution

To accomplish the above objects, according to one aspect of the present invention, there is provided a pipe fixing system comprising: a body provided with a stepped part formed on the lower portion of the inside thereof for stopping the movement of the end of a pipe and with a tapered inner peripheral surface having a diameter gradually narrowed toward the outer side thereof from the inner side thereof; a plurality of jaws adapted to be guided to the tapered inner peripheral surface of the body in such a manner as to be moved toward an inlet of the body and fastened in a central direction with respect to the pipe to serve as wedges in such a manner that the plurality of jaws are interposed between the tapered inner peripheral surface of the body and the outer peripheral surface of the pipe: and a jaw-coupling cylindrical plate spring member mounted at the inside of the body in such a manner as to be supported at the lower end thereof by the inner bottom surface of the body, the jaw-coupling cylindrical plate spring member provided with a plurality of cut lines formed vertically from the portion separated by a given distance from the lower end thereof to the middle portion thereof in such a manner as to be equally spaced at relatively narrow intervals in a circumferential direction thereof, with a plurality of elastic piece parts each formed of a plate-like shape and each disposed between the adjacent cut lines in such a manner as to be bent outwardly to provide an elastic force toward the upper portion thereof, and with a plurality of coupling holes formed along the peripheral surface thereof on the upper side of the plurality of elastic piece parts for inserting the plurality of jaws thereinto such that the plurality of jaws are kept at a horizontal level.

To accomplish the above objects, according to another aspect of the present invention, there is also provided a pipe fixing system comprising: a body provided with a stepped part formed on the lower portion of the inside thereof for stopping the movement of the end of a pipe and with a tapered inner peripheral surface having a diameter gradually narrowed toward the outer side thereof from the inner side thereof; a plurality of jaws adapted to be guided to the tapered inner peripheral surface of the body in such a manner as to be moved toward an inlet of the body and fastened in a central direction with respect to the pipe to serve as wedges in such a manner that the plurality of jaws are interposed between the tapered inner peripheral surface of the body and the outer peripheral surface of the pipe; a single cylindrical plate spring member mounted at the inside of the body in such a manner as to be supported at the lower end thereof by the inner bottom surface of the body, the single cylindrical plate spring member being provided with a plurality of cut lines formed vertically from the portion separated by a given distance from the lower end thereof to the middle portion thereof in such a manner as to be equally spaced at relatively narrow intervals in a circumferential direction thereof and with a plurality of elastic piece parts each formed of a plate-like shape and each disposed between the adjacent two cut lines in such a manner as to be bent outwardly to provide an elastic force toward the upper portion thereof; and a horizontal level-maintaining ring member mounted into a ring-insertion groove part formed in the inner peripheral surface of each of the plurality of jaws in such a manner as to be face-contacted with the top end periphery of the single cylindrical plate spring member and have an elastic force supplied from the single cylindrical plate spring member, for maintaining the plurality of jaws at a horizontal level.

Preferably, the single cylindrical plate spring member may further include a plurality of middle cut lines each formed to a relatively short length along a longitudinal direction thereof and each disposed between the adjacent two elastic piece parts, for facilitating the bending forces of the middle portions of the plurality of elastic piece parts.

Preferably, the horizontal level-maintaining ring member may have a generally flat rectangular section, takes a ring-like shape by winding in two rows, and has free both end portions in such a manner as to be expanded and contracted in an outer diameter thereof.

Preferably, a snap ring may be adapted to be inserted into a ring groove part formed along the inner peripheral portion of the inlet of the body, the snap ring having through-holes formed at the both sides thereof, the through-holes facing each other.

Preferably, a packing retaining part and a locking protrusion part may be formed between the stepped part at the inside of the body and the single cylindrical plate spring member in such a manner that a packing having an X-shaped section is inserted into the packing retaining part and a support ring member having the same shape and function as the horizontal level-maintaining ring member is locked to the locking protrusion part, the support ring member being closely contacted with the packing.

ADVANTAGEOUS EFFECTS

The present invention provides a pipe fixing system that can provide generally uniform elasticity to a plurality of jaws serving as wedges fixing a pipe thereto and can make the horizontal level among the plurality of jaws precisely maintained, thereby making a pipe fixed in a more rigid way and also improving the reliability of the product.

According to the present invention, furthermore, the plurality of jaws into which the pipe is mounted are rotated, and thus, even though the pipe is forcedly turned for separation, the wedge function of the plurality of jaws is not weakened, such that the pipe is not separated and damaged at all. Also, the pipe fixing system of this invention is configured in a simpler manner when compared with the existing system, thereby preventing production costs from being raised and providing a product excellent in terms of performance and quality.

BRIEF DESCRIPTION OF THE DRAWINGS

Further objects and advantages of the invention can be more fully understood from the following detailed description taken in conjunction with the accompanying drawings, in which.

BEST MODE FOR CARRYING OUT THE INVENTION

Now, an explanation on the preferred embodiments of the present invention will be in detail given with reference to attached drawings.

FIGS. 1 to 5 show a pipe fixing system according to a first embodiment of the present invention.

Figure 1:
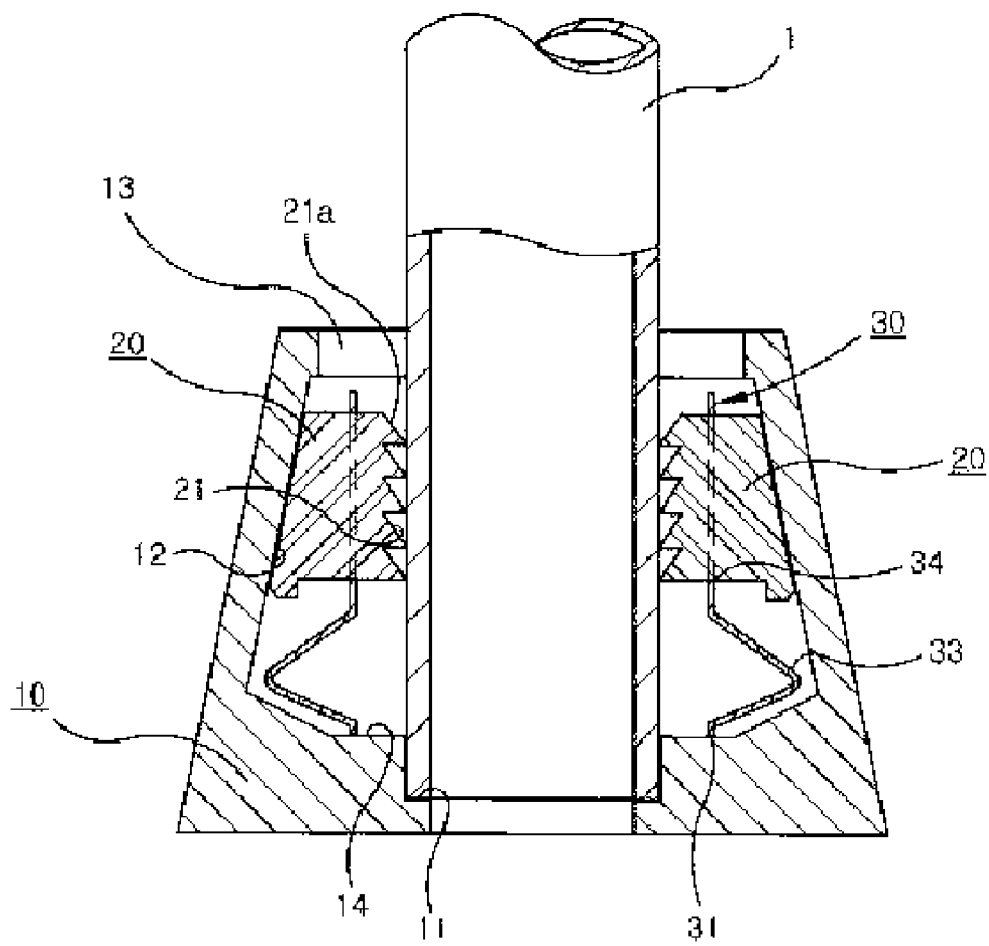
FIG. 1 is a longitudinal sectional view of a pipe fixing system according to a first embodiment of the present invention.

Referring to FIG. 1, the pipe fixing system of the present invention includes a body 10, a plurality of jaws 20, and a jaw-coupling cylindrical plate spring member 30.

The body 10 is provided with a stepped part 11 formed on the lower portion of the inside thereof for stopping the movement of the end of a pipe 1 and with a tapered inner peripheral surface 12 having a diameter gradually narrowed toward the inlet thereof from the inner side thereof.

The plurality of jaws 20 are adapted to be guided to the tapered inner peripheral surface 12 of the body 10 in such a manner as to be fastened in a central direction with respect to the pipe 1 as they are moved toward an inlet 13 of the body 10 and thus to pressurize the outer peripheral surface of the pipe 1, serving as wedges in such a manner that the plurality of jaws are interposed between the tapered inner peripheral surface of the body and the outer peripheral surface of the pipe, thus making the pipe 1 fixed.

Thus, each of the plurality of jaws 20 has a substantially smooth outer peripheral surface in such a manner as to be gently contacted with the tapered inner peripheral surface 12 of the body 10 and has an inner peripheral surface on which a toothed part 21 is formed.

The jaws 20 are composed of at least two or more ones, desirably three to five ones. In this case, as the diameter of pipe becomes larger, the number of jaws is accordingly increased.

The principal feature of the present invention is directed to the jaw-coupling cylindrical plate spring member 30, and FIGS. 2a and 2b illustrate a manufacturing process of the jaw-coupling cylindrical plate spring member 30.

Figure 2:
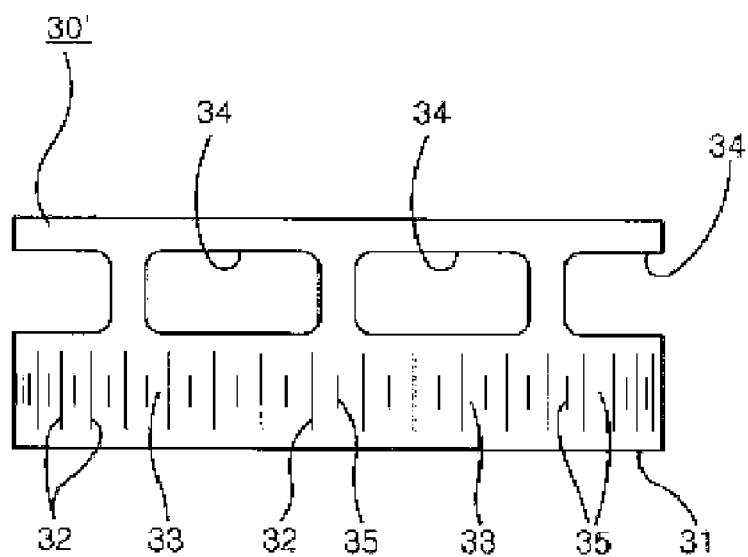
FIGS. 2 and 3 are front and plane views of describing a manufacturing process of a jaw-coupling cylindrical plate spring member in the pipe fixing system according to the first embodiment of the present invention.
Figure 3:
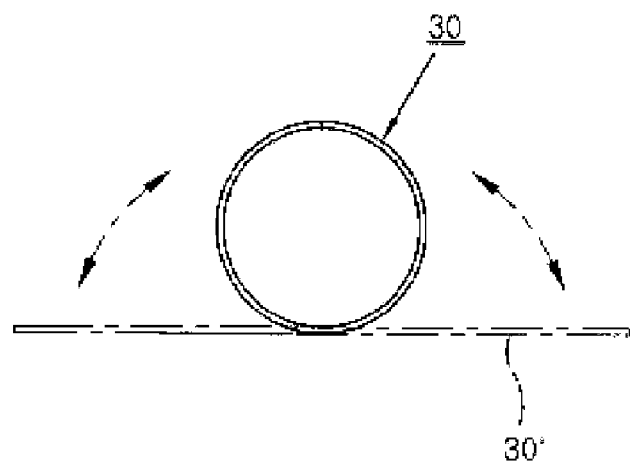

Referring to FIG. 2, the jaw-coupling cylindrical plate spring member 30 is configured such that it includes a relatively thin flat plate spring member 30 on which a plurality of cut lines 32, a plurality of middle cut lines 35, and a plurality of coupling holes 34 are formed, and it is rolled, as shown in FIG. 3. At this time, the both end portions to be contacted with each other are spot-welded at one to two points thereon such that they are not separated from each other.

Figure 4:
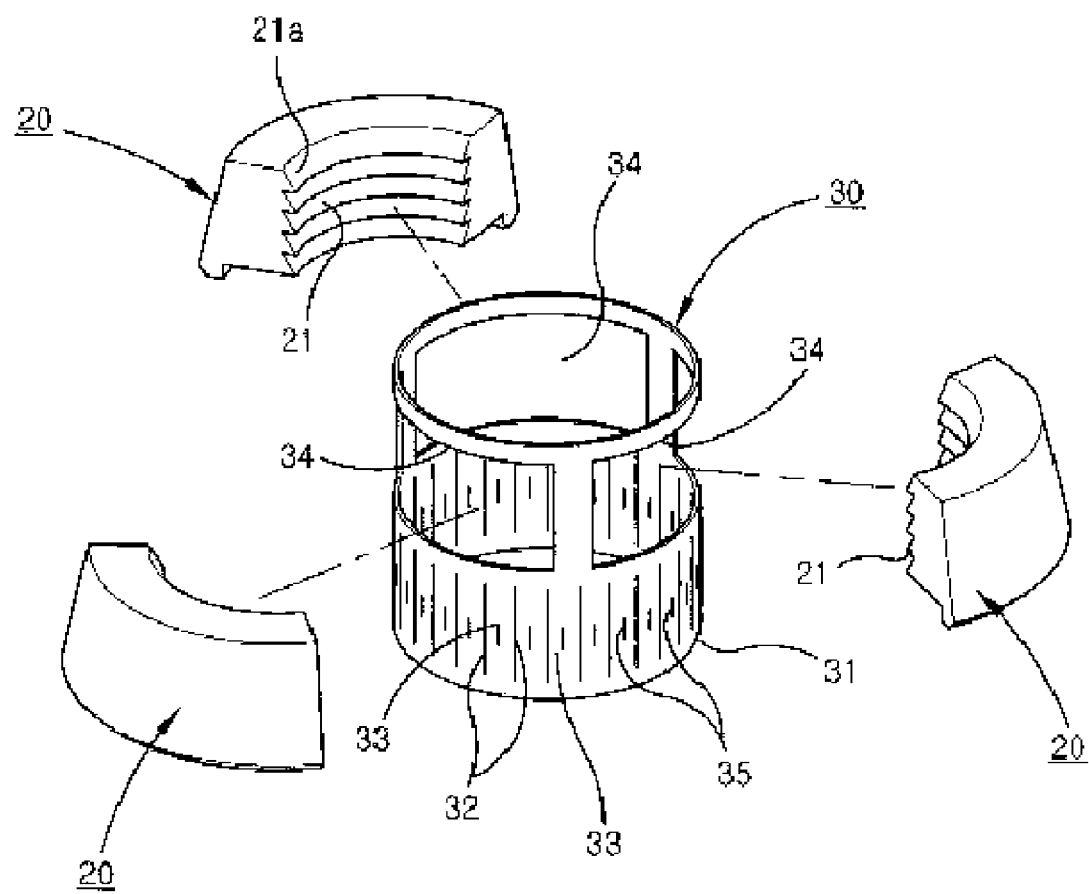
FIG. 4 is a perspective view of showing the jaws separated from the jaw-coupling cylindrical plate spring member in the pipe fixing system according to the first embodiment of the present invention.

Referring to FIG. 4, the jaw-coupling cylindrical plate spring member 30 forms the plurality of cut lines 32 arranged vertically from the portion separated by a given distance from the lower end portion 31 thereof to the middle portion thereof in such a manner as to be equally spaced at relatively narrow intervals in a circumferential direction thereof.

Thus, the jaw-coupling cylindrical plate spring member 30 provides an elastic piece part 33 between the adjacent two cut lines 32.

Further, the jaw-coupling cylindrical plate spring member 30 provides the plurality of coupling holes 34 arranged in a circumferential direction on the upper portion thereof, the coupling holes 34 having the jaws 20 inserted thereinto.

As a result, the plurality of jaws 20 that are inserted into the coupling holes 34 are always placed at a horizontal level.

Figure 5:
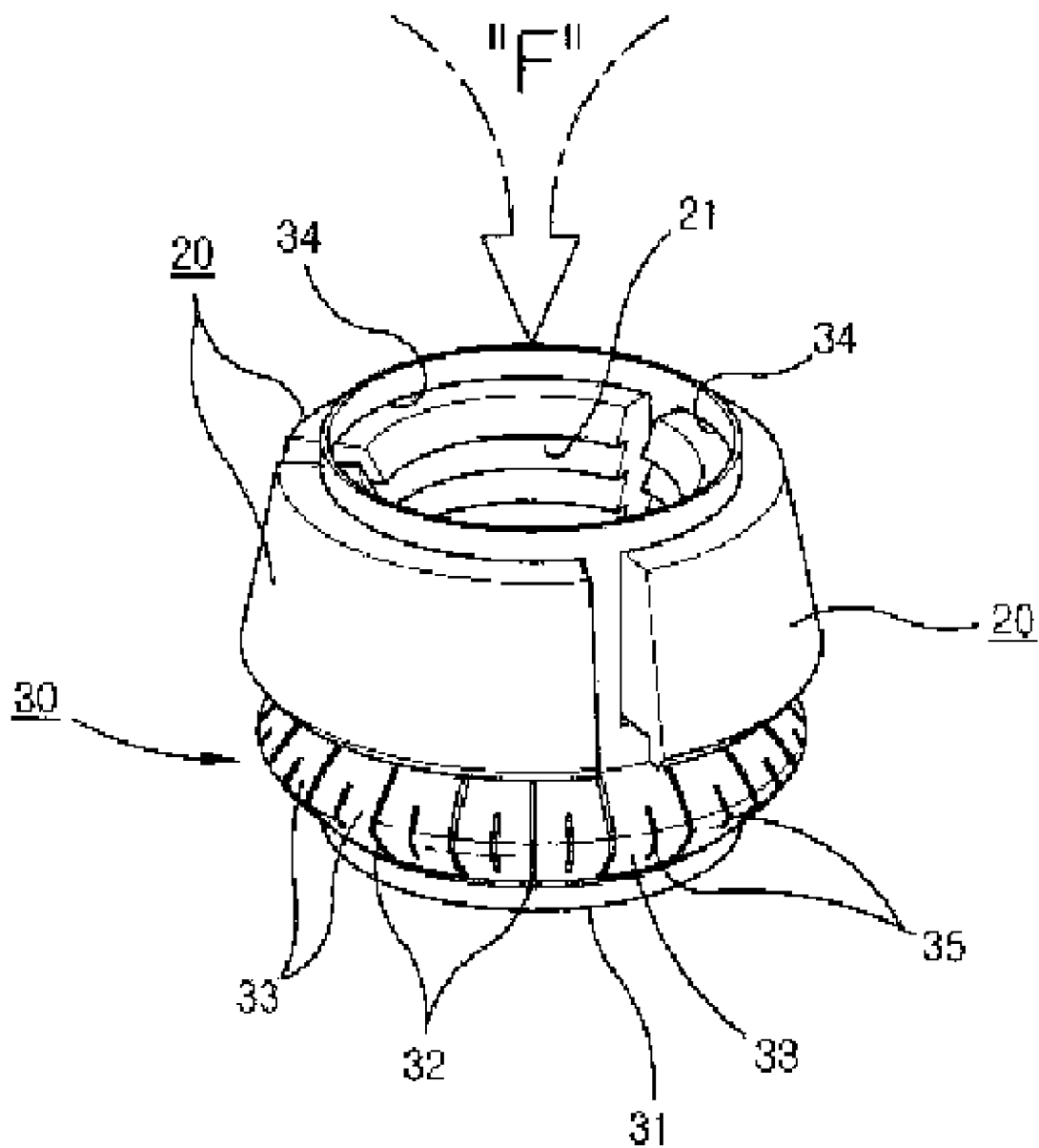
FIG. 5 is a perspective view of showing the operation of the jaw-coupling cylindrical plate spring member in the pipe fixing system according to the first embodiment of the present invention.

Referring to FIG. 5, if a given pressure F is applied to the upper end portion of the jaw-coupling cylindrical plate spring member 30, the plurality of cut lines 32 are opened such that the plurality of elastic piece parts 33 are bent outwardly.

At this time, the plurality of elastic piece parts 33 has the elasticity of returning to their original state.

In this case, the elasticity of each elastic piece part 33 depends upon the cut length of each cut line 32 and the thickness and width of each elastic piece part 33.

However, if the length of each cut lines 32 and the thickness of each elastic piece part 33 are determined to given values, the elasticity of each elastic piece part 33 is determined by the width set between the adjacent two cut lines 32.

For instance, if the interval between the adjacent cut lines 32 is set large, the width of the elastic piece part 33 becomes large such that the elasticity of each elastic piece part 33 becomes high. To the contrary, if the interval between the adjacent cut lines 32 is set small, the width of the elastic piece part 33 becomes small such that the elasticity of each elastic piece part 33 becomes low.

Therefore, according to the present invention, the elastic piece parts 33 having the elasticity corresponding to pipes having a variety of diameters can be made, without any change in the material and standard of the jaw-coupling cylindrical plate spring member 30.

Further, the jaw-coupling cylindrical plate spring member 30 has the middle cut line 35 in the middle portion of the elastic piece part 33 between the two adjacent cut lines 32, the middle cut line 35 formed to a relatively small length. As a result, the middle portion of the elastic piece part 33 can be bent well.

If the jaw-coupling cylindrical plate spring member 30 is inserted into the body 10 and pressed at the upper portion thereof after the coupling of the jaws 20 with the coupling holes 34, the middle portions of the elastic piece parts 33 are bent such that the jaw-coupling cylindrical plate spring member 30 and the body 10 are easily assembled with each other.

Now, an explanation of the operation of the pipe fixing system according to the first embodiment of the present invention is given with reference to FIG. 1.

If the pipe 1 is pushed into the inlet 13 of the body 10, it pushes the top end portions 21a of the toothed parts 21 of the jaws 20 such that it is inserted into the body 10.

In this case, the jaws 20 are moved down in a relatively large space in the interior of the body 10, so that the pipe 1 can be inserted into the body 10, without any many efforts.

If the pipe 1 is not further inserted into the body by means of the stepped part 11, no force is applied to the jaws 20 and at this time, the jaws 20 are moved to the inlet 13 of the body 10 by the elasticity of the plurality of elastic piece parts 33.

At this time, since the plurality of jaws 20 are fit to the coupling holes 34 of the jaw-coupling cylindrical plate spring member 30, they are moved in the state of keeping their horizontal level.

The plurality of jaws 20 that are moved to the inlet 13 of the body 10 are guided by means of the tapered inner peripheral surface 12, and thus, they are at the same time moved in the central direction of the pipe 1, with a result that they are closely contacted with the outer peripheral surface of the pipe 1.

At the state where the movement of the plurality of jaws 20 is completely finished, thus, the plurality of jaws 20 serves as wedges between the tapered inner peripheral surface 12 of the body 10 and the pipe 1, thereby preventing the pipe 1 from being further moved toward the inlet 13 of the body 10.

According to the present invention, the plurality of jaws 20 act as wedges between the body 10 and the pipe 1, being maintained at their horizontal level with respect to the cylindrical surface of the pipe 1, which allows the pipe 1 to be rigidly fixed to the body 1.

In other words, the pipe fixing system of the present invention serves to fix the outer peripheral surface of the pipe 1 with a uniform force, which makes the pipe 1 fixed well, without any movement.

If the pipe 1 is to be removed, in most cases, it is forcedly rotated in left and right directions.

In this case, the toothed parts 21 of the jaws 20 are closely contacted with the outer peripheral surface of the pipe 1, and thus, the outer peripheral surfaces of the jaws 20 and the tapered inner peripheral surface 12 of the body 10 are smoothly processed. As a result, the plurality of jaws 20 is rotated together with the pipe 1.

That is to say, since the plurality of jaws 20 are integrally coupled with the jaw-coupling cylindrical plate spring member 30 and the lower end portion 31 of the jaw-coupling cylindrical plate spring member 30 is face-contacted with the inner bottom surface 14 of the body 10, the pipe 1 and the plurality of jaws 20 coupled with the jaw-coupling cylindrical plate spring member 30 are of an integral body, so that the whole body is just rotated, without any separation of the pipe 1 from the body 10.

In the prior arts, however, the jaws are not rotated when the pipe is rotated for removal from the body, such that the outer peripheral surface of the pipe is worn out by the toothed parts of the jaws.

As a result, since the gap between the pipe and the jaws is generated, the pipe is unexpectedly removed when it is forcedly pulled, thereby making it impossible to recycle the pipe.

According to the present invention, if the pipe 1 is to be removed, the jaws 20 are pressurized through the inlet 13 of the body 10 by using a tool like a driver, the jaws 20 are moved in a downward direction thus to be placed in the large space of the interior of the body 10, such that the jaws 20 lose their wedge actions and at the same time, the gap between the pipe 1 and the jaws 20 is generated, thus to easily separate the pipe 1 from the body 10.

FIGS. 6 to 9 show a pipe fixing system according to a second embodiment of the present invention.

An explanation of the same parts in the second embodiment of the present invention as the first embodiment of the present invention will be avoided, and the parts corresponding to those of FIGS. 1 to 5 are indicated by corresponding reference numerals in the second embodiment of the present invention.

Figure 6:
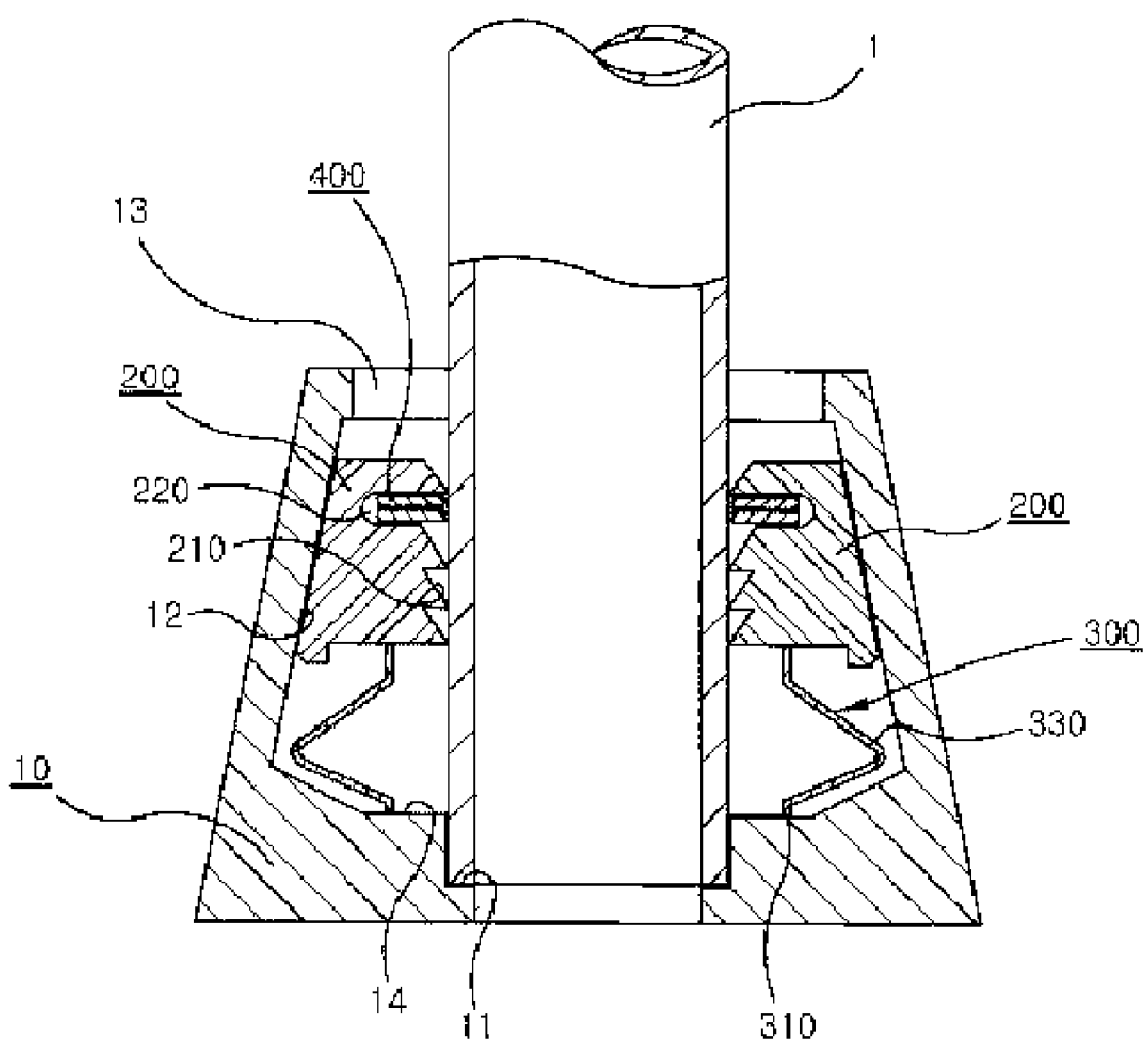
FIG. 6 is a longitudinal sectional view of a pipe fixing system according to a second embodiment of the present invention.

Referring to FIG. 6, the body 10 of the pipe fixing system according to the second embodiment of the present invention has the same structure as in the first embodiment of the present invention.

The pipe fixing system further includes a single cylindrical plate spring member 300 mounted in the interior of the body 10 and a plurality of jaws 200 placed over the single cylindrical plate spring member 300 to be kept at a horizontal level by means of the formation of a horizontal level-maintaining ring member 400.

Figure 7:
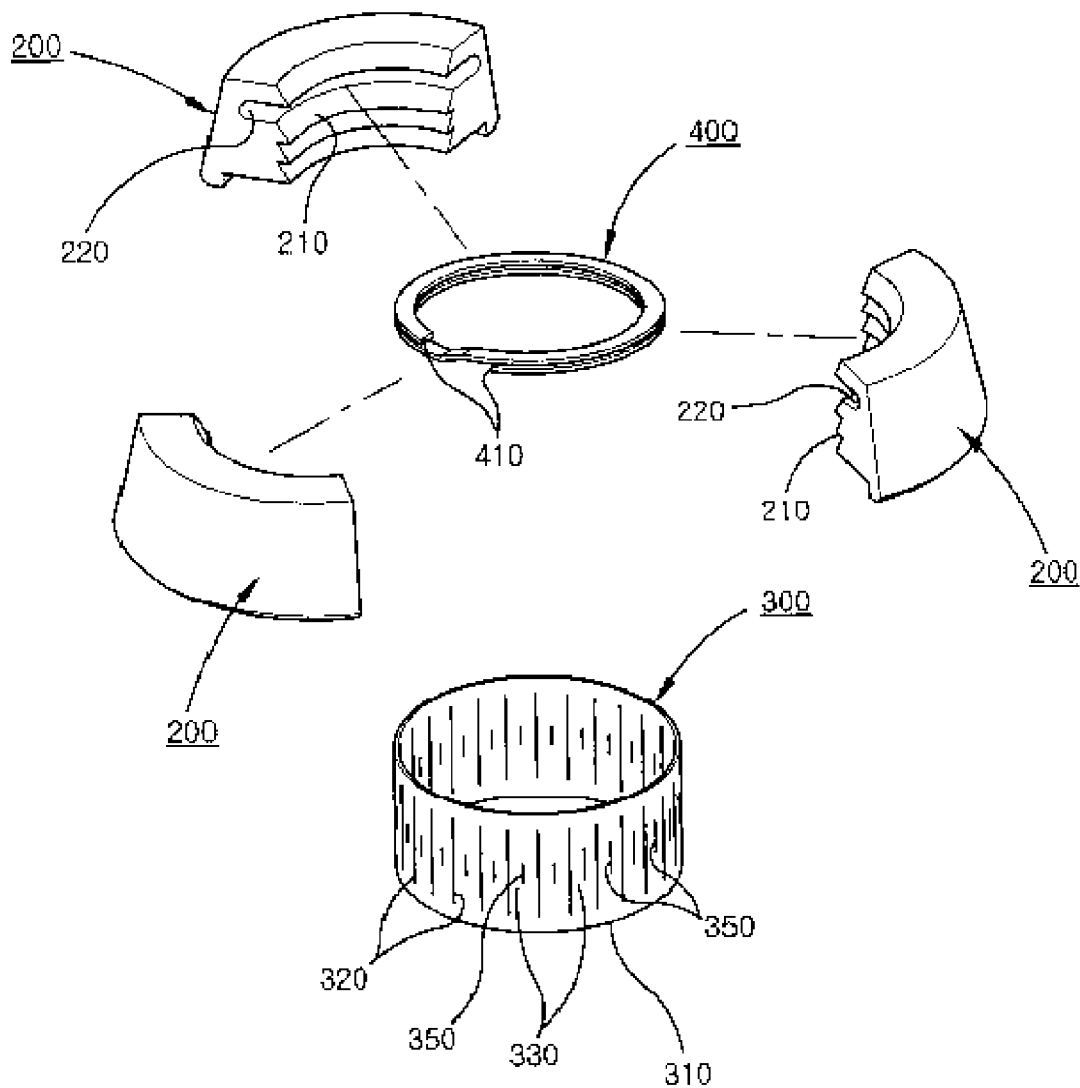
FIG. 7 is a separate perspective view of showing the main parts of the pipe fixing system according to the second embodiment of the present invention.

Referring to FIG. 7, the single cylindrical plate spring member 300 forms a plurality of cut lines 320 arranged vertically from the portion separated by a given distance from the lower end portion 310 thereof to the upper end portion thereof in such a manner as to be equally spaced at relatively narrow intervals in a circumferential direction thereof. If a given pressure is applied to the upper end portion of the single cylindrical plate spring member 300, an elastic piece part 330 that is formed between the adjacent two cut lines 320 is bent outwardly, such that the elasticity caused from the plurality of elastic piece parts 330 works toward the upper portion of the single cylindrical plate spring member 300.

Further, the single cylindrical plate spring member 300 has a middle cut line 350 in the middle portion of the elastic piece part 330 between the adjacent two cut lines 320, the middle cut line 350 formed to a relatively small length. As a result, the middle portion of the elastic piece part 330 can be bent well.

Each of the plurality of jaws 200 has a ring-insertion groove part 220 in the middle portion of the toothed part 210 along the inner surface thereof.

The horizontal level-maintaining ring member 400 is formed by pressing a spring steel material and rolling it in two rows in such a manner as to be flat in the section thereof, having the both end parts 410 that are not in contact with each other.

Figure 8:
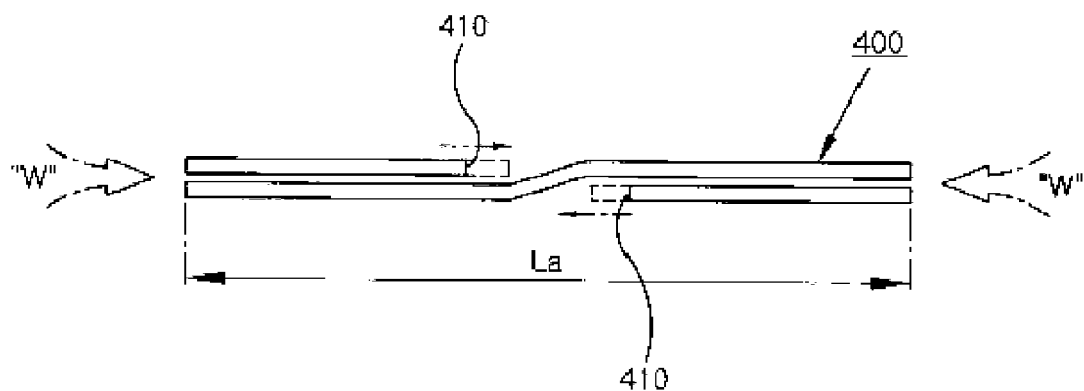
FIGS. 8 and 9 are exemplary views of showing the operation of the horizontal level-maintaining ring member of the pipe fixing system according to the second embodiment of the present invention.
Figure 9:
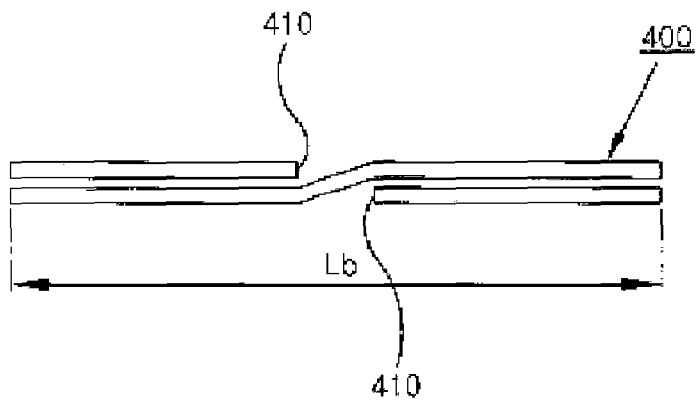

FIG. 8 shows the horizontal level-maintaining ring member 400 that is completely made as mentioned above. At this state, the horizontal level-maintaining ring member 400 is compressed as an external force W is applied to the outer peripheral surface thereof 400, and the both end parts 410 thereof are moved by the imaginary line as shown in FIG. 7a, such that the original diameter La of the horizontal level-maintaining ring member 400 is reduced to the compressed diameter Lb as shown in FIG. 9. If the external force W disappears, the horizontal level-maintaining ring member 400 is returned to the original diameter La.

That is, the horizontal level-maintaining ring member 400 is returned to the original diameter even though the external force is applied thereto, which makes the ring member 400 kept in a completely round shape, such that it serves to maintain the plurality of jaws 200 at a horizontal level, without any deviation of the plurality of jaws 200, and to be compressed when it is inserted into the inlet 13 of the body 10.

Referring back to FIG. 6, the horizontal level-maintaining ring member 400 is inserted into the ring-insertion groove parts 200 of the plurality of jaws 200, and after the insertion, the plurality of jaws 200 which are kept at their horizontal level are mounted on the single cylindrical plate spring member 300.

Thus, the plurality of jaws 200 are provided with the elasticity of the elastic piece parts 330 of the single cylindrical plate spring member 300.

In the second embodiment of the present invention as constructed above, the pipe 1 is inserted and moved by the elasticity of the single cylindrical plate spring member 300, resulting in the wedge action between the body 10 and the pipe 1, which is the same as in the first embodiment of the present invention, and an explanation thereof is avoided herein.

Furthermore, if the pipe 1 is forcedly rotated for removal from the body 10, the jaws 200 to which the horizontal level-maintaining ring member 400 is mounted are rotated together with the pipe 1 over the upper end portion of the single cylindrical plate spring member 300, which causes the pipe 1 to be just rotated, without any separation from the body 10.

At this time, since the horizontal level-maintaining ring member 400 is returned to its original shape even with an excessive force applied thereof, it still serves to maintain the plurality of jaws 200 at their horizontal level, thereby making the pipe 1 rigidly fixed to the body 10.

Figure 10:
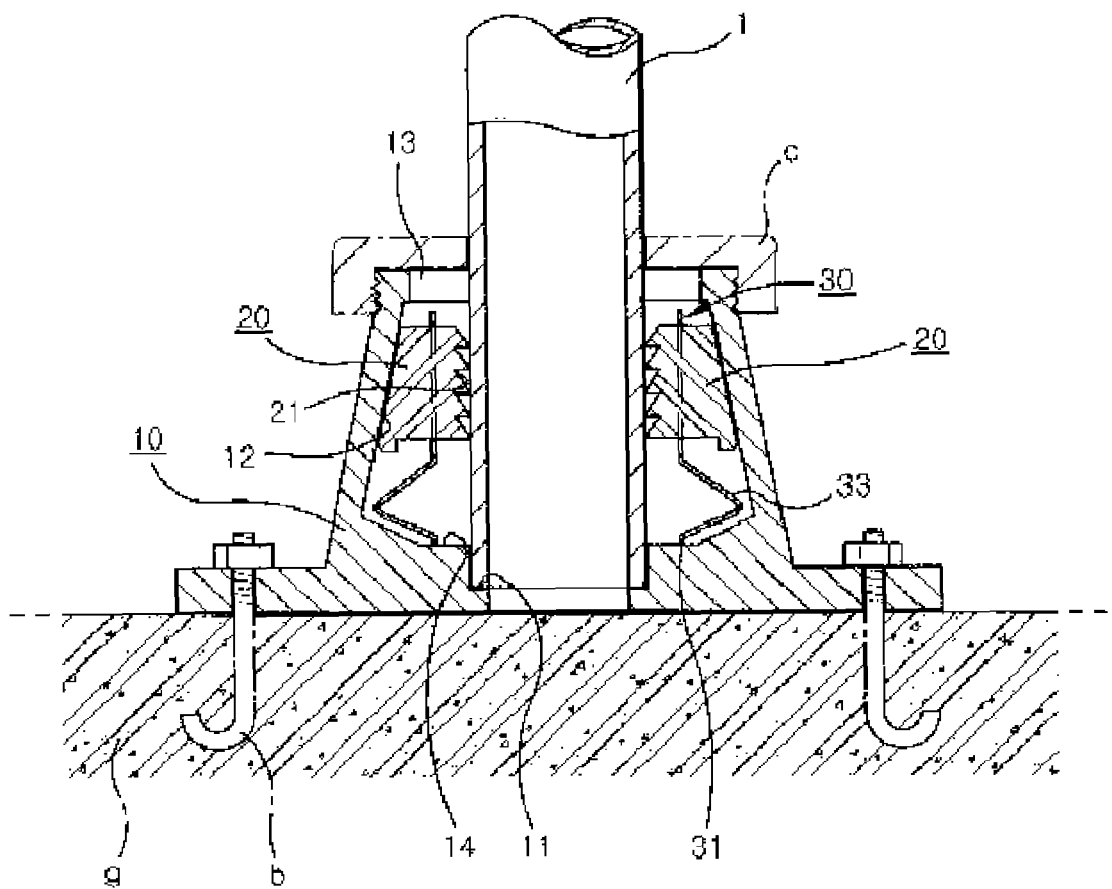
FIGS. 10 and 11 are sectional views of showing examples where the pipe fixing systems according to the first and second embodiments of the present invention are employed.
Figure 11:
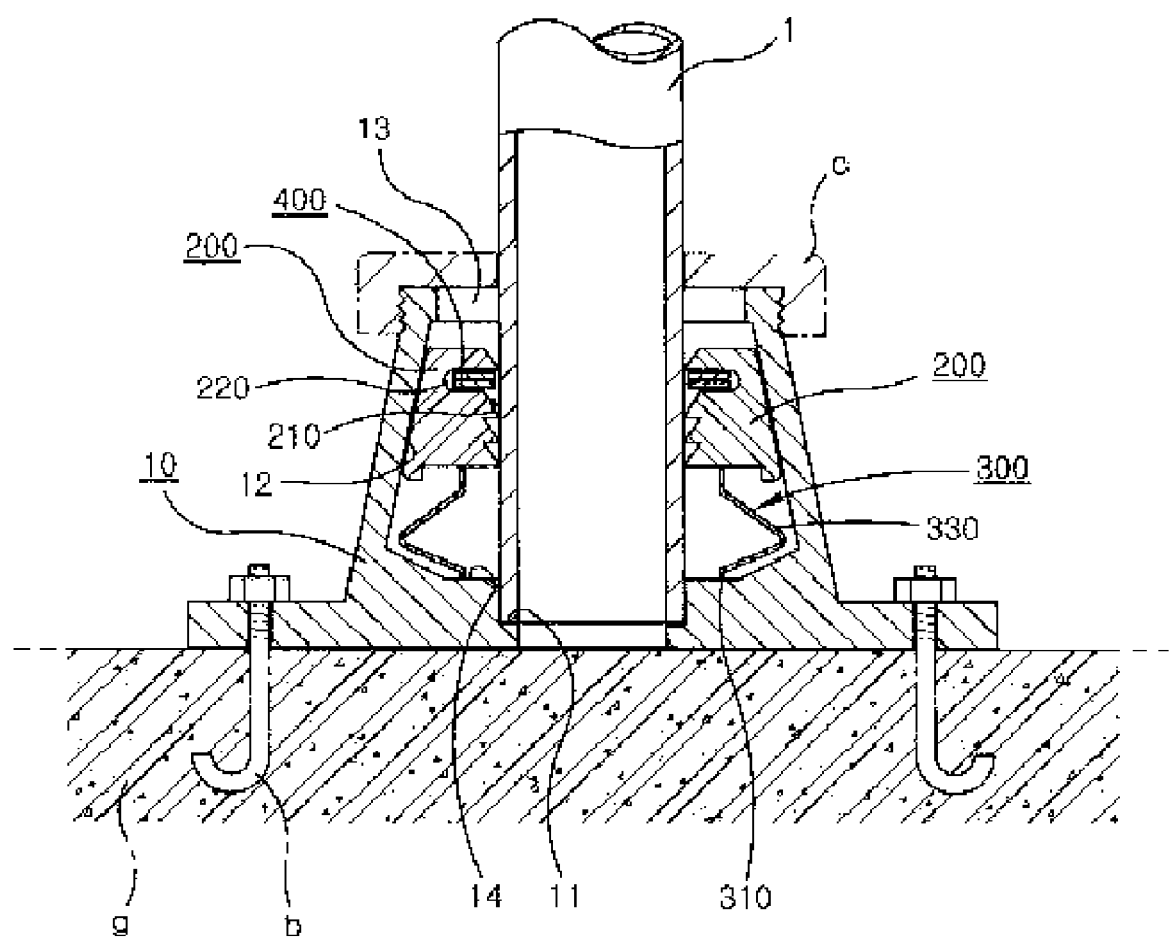

FIGS. 10 and 11 show examples where the pipe fixing systems according to the first and second embodiments of the present invention are employed.

In these examples, if the pipe 1 is used as a post or a support rod, the body 10 is fixed by means of anchor bolts b on the ground g and then, the pipe 1 is fixedly inserted into the body 10.

Next, a cover c is fastened to the inlet 13 of the body 10, for previously preventing various foreign materials from entering the body 10.

Figure 12:
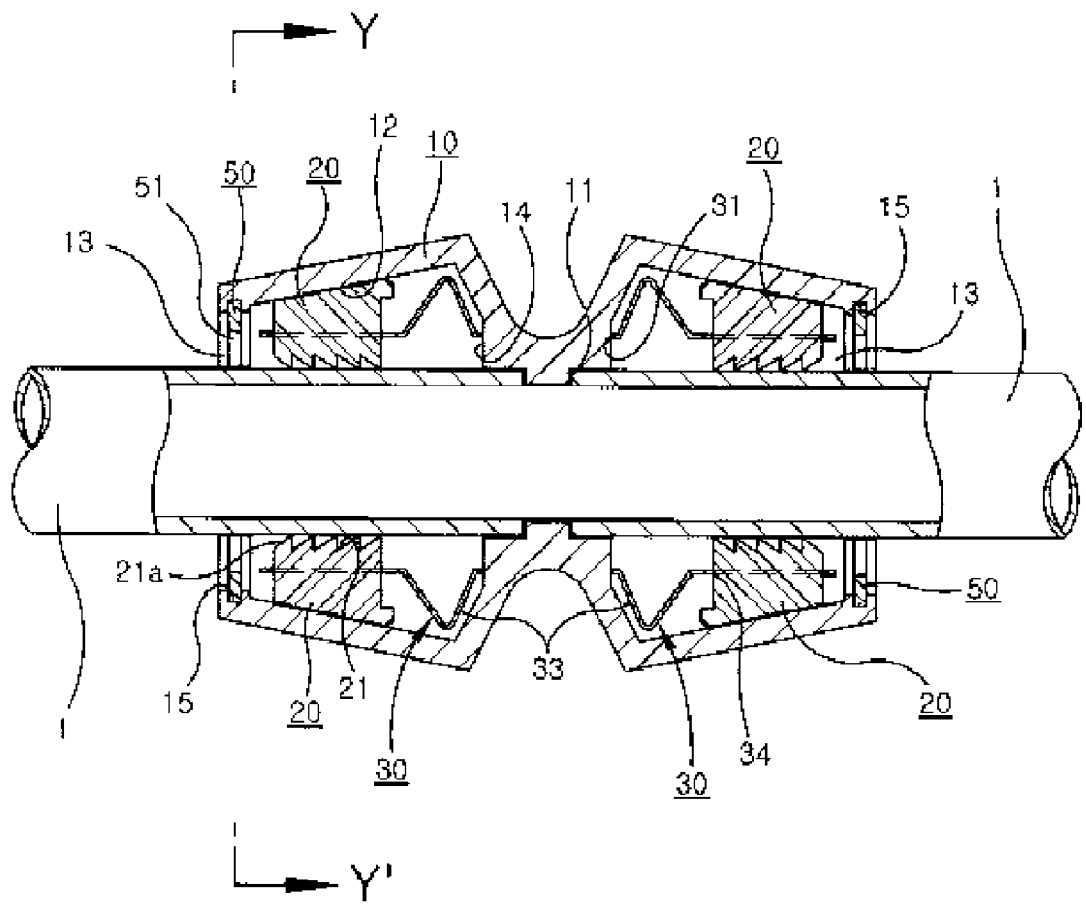
FIGS. 12 and 13 are sectional views of showing another example where the pipe fixing systems according to the first and second embodiments of the present invention are employed.
Figure 13:
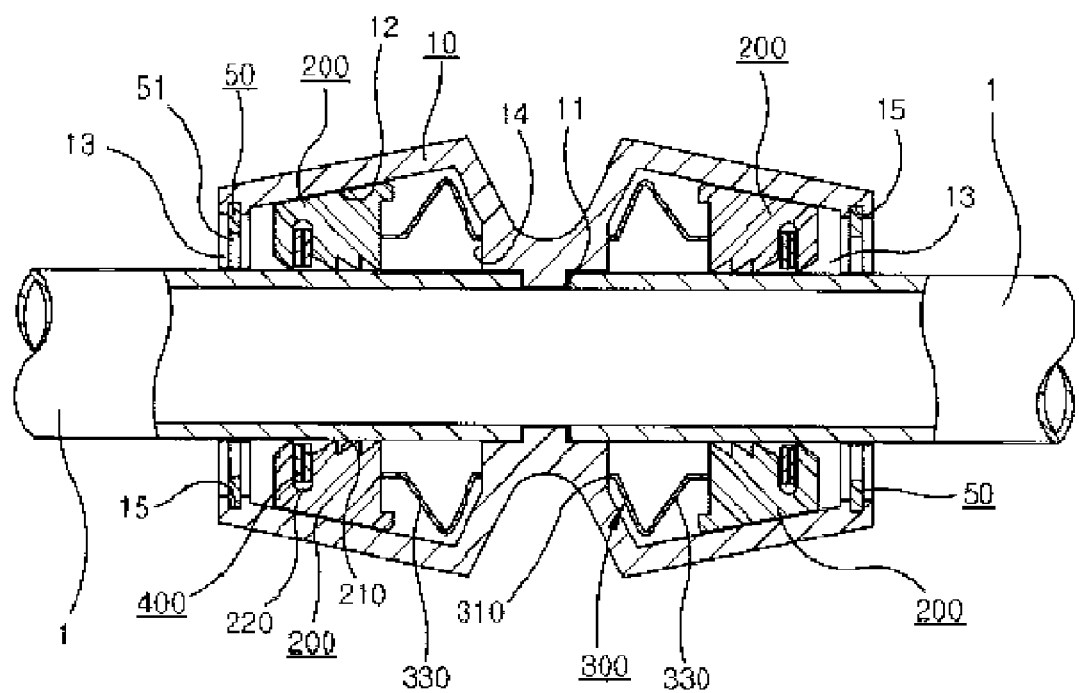

FIGS. 12 and 13 show another example where the pipe fixing systems according to the first and second embodiments of the present invention are employed.

In these examples, the pipe fixing system of the present invention is used to connect the pipe 1 to another pipe 1.

In this case, the two pipe fixing systems are united to a single body in such a manner as to be faced with each other.

Thus, the pipes 1 are inserted into the both sides of the two pipe fixing systems, thereby connecting the pipes 1 with each other.

Next, a snap ring 50 having a generally flat section is fitted along a ring groove part 15, for greatly preventing various foreign materials from entering the body 10.

Figure 14:
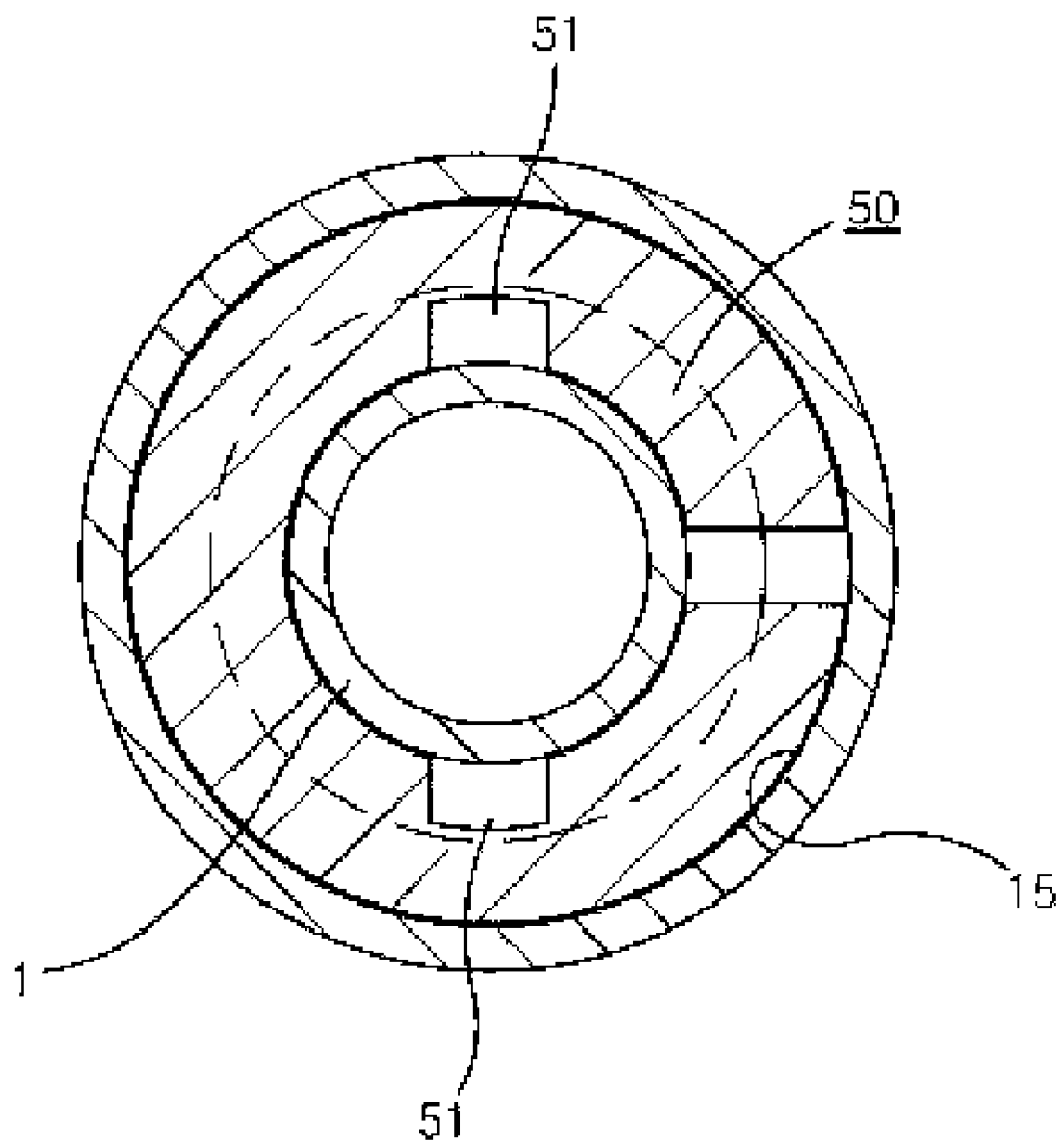
FIG. 14 is an enlarged sectional view taken along the line Y-Y of FIG. 12.

The snap ring 50 is C-shaped, as shown in FIG. 14, having through-holes 51 formed at the both sides thereof, the through-holes 51 facing each other.

The through-holes 51 are used to remove the pipe 1 from the body 10 in such a manner that a tool like a driver is first inserted into the through-holes 51 to push the jaws 20 or 200, thus to form the gap between the pipe 1 and the body 10.

On the other hand, so as to provide a closed structure where the foreign materials do not enter the inlet 13 of the body 10 to the pipe fixing system of the present invention, the inlet 13 is rolled or cut to have only the hole into which the pipe 1 is inserted and further to have groove parts having the same function as the through-holes 51 formed at the both sides of the snap ring 50.

Figure 15:
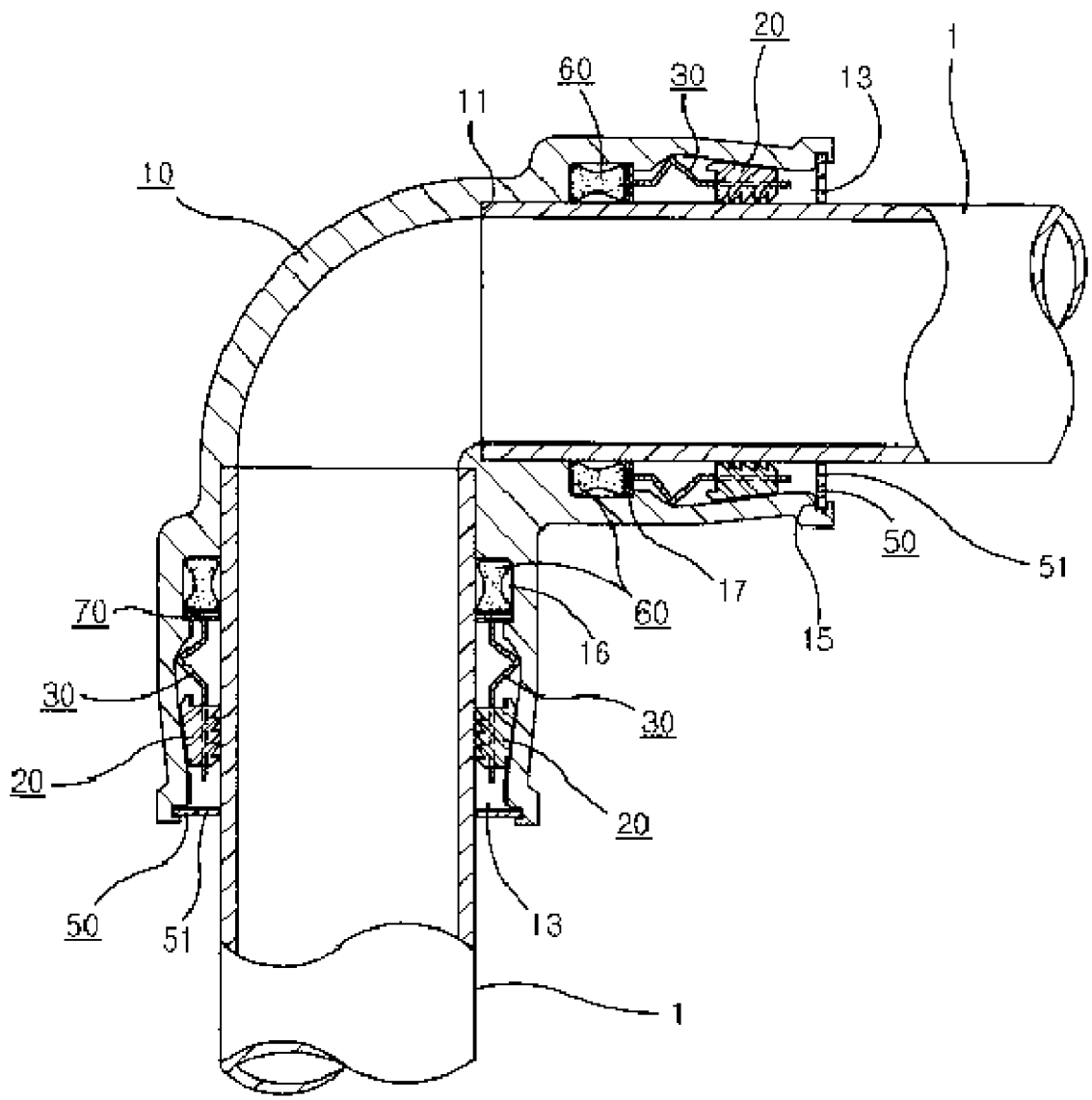
FIGS. 15 and 16 are sectional views of showing still other examples where the pipe fixing systems according to the first and second embodiments of the present invention are employed.
Figure 16:
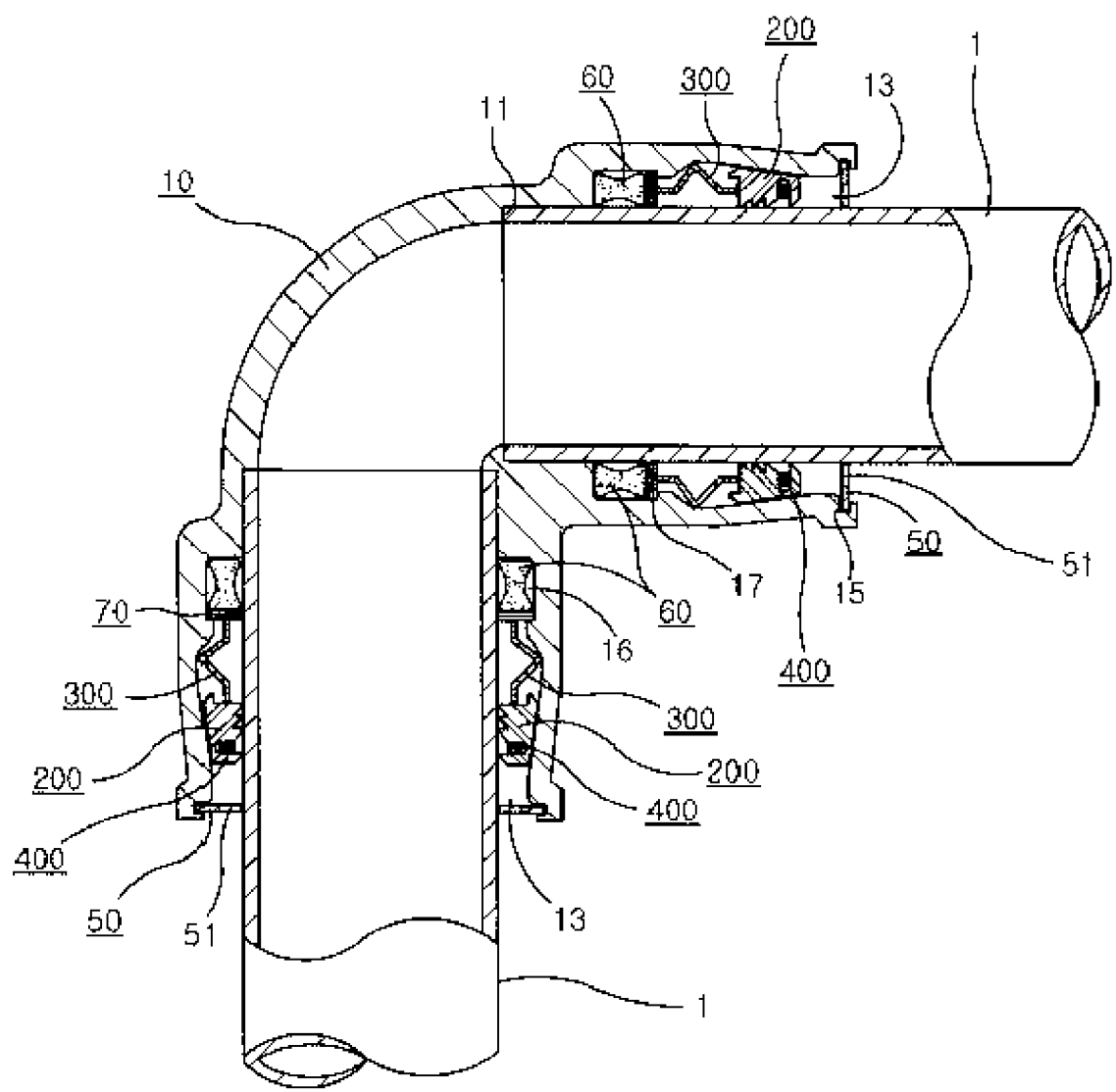

FIGS. 15 and 16 show still another example where the pipe fixing systems according to the first and second embodiments of the present invention are employed.

In these examples, the pipe fixing system of the present invention is used to connect the pipes 1 through which fluid or gas flows or adopted to an elbow.

In this case, a packing 60 having an X-shaped section is inserted into a packing retaining part 16 formed over the stepped part 11 of the body 10, and a support ring member 70 having the same structure as the horizontal level-maintaining ring member 40 is formed at the outside of the packing 60 in such a manner as to be locked to a locking protrusion part 17.

The X-shaped packing 60 serves to provide a fully air-tight result, and the support ring member 70 has the same structure as the horizontal level-maintaining ring member 400 and the reduced outer diameter, such that the support ring member 70 can be easily inserted into the packing retaining part 16, and even when water pressure is applied to the packing 60, the support ring member 70 provides the uniform reaction force against the packing 60.

In other words, if the water pressure is applied to the packing 60, it is delivered through the packing 60 to the support ring member 70, with a result that the support ring member 70 generates the reaction force acting against the packing 60. At this time, in case of a C-shaped snap ring used typically as a simple structure, it is partly opened such that it does not provide the entirely uniform reaction force against the packing. To the contrary, the support ring member 70 is expanded and compressed and also, it is of a round shape, such that it provides a generally uniform reaction force against the packing 60. As a result, the support ring member 70 comes in greatly close contact with the outer peripheral surface of the pipe 1 with which the packing 60 is contacted and with the packing retaining part 16, which enables the air-tight effect of the packing 60 to be more improved.

INDUSTRIAL APPLICABILITY

As set forth in the foregoing, according to the preferred embodiments of the present invention, the pipe fixing system can be applied to a fixing device for fixing a pipe as a post and a connecting device for connecting pipes. It is to be therefore appreciated that those skilled in the art can change or modify the embodiments without departing from the scope and spirit of the present invention.

The present invention can be applied to various elbows like an L-shaped elbow, a T-shaped elbow, and so on, and in some cases, the present invention can be applied to nipples employed as a variety of pipe connecting parts.

The invention claimed is:

1. A pipe fixing system comprising:
    a body (10) provided with a stepped part (11) formed on the lower portion of the inside thereof for stopping the movement of the end of a pipe (1) and with a tapered inner peripheral surface (12) having a diameter gradually narrowed toward the outer side thereof from the inner side thereof;
    a plurality of jaws (20) adapted to be guided to the tapered inner peripheral surface (12) of the body (10) in such a manner as to be moved toward an inlet (13) of the body (10) and fastened in a central direction with respect to the pipe (1) to serve as wedges in such a manner that the plurality of jaws (20) are interposed between the tapered inner peripheral surface (12) of the body (10) and the outer peripheral surface of the pipe (1): and
    a jaw-coupling cylindrical plate spring member (30) mounted at the inside of the body (10) in such a manner as to be supported at the lower end thereof by the inner bottom surface of the body (10), the jaw-coupling cylindrical plate spring member (30) provided with a plurality of cut lines (32) formed vertically from the portion separated by a given distance from the lower end thereof to the middle portion thereof in such a manner as to be equally spaced at relatively narrow intervals in a circumferential direction thereof, with a plurality of elastic piece parts (33) each formed of a plate-like shape and each disposed between the adjacent cut lines (32) in such a manner as to be bent outwardly to provide an elastic force toward the upper portion thereof, and with a plurality of coupling holes (34) formed along the peripheral surface thereof on the upper side of the plurality of elastic piece parts (33) for inserting the plurality of jaws (20) thereinto such that the plurality of jaws (20) are kept at a horizontal level.

2. A pipe fixing system according to claim 1, wherein the jaw-coupling cylindrical plate spring member (30) further includes a plurality of middle cut lines (35) formed to a relatively short length along a longitudinal direction thereof between the adjacent two elastic piece parts (33), for facilitating bending effect of the middle portions of the elastic piece parts (33).

3. A pipe fixing system according to claim 1, wherein a snap ring (50) is adapted to be inserted into a ring groove part (15) formed along the inner peripheral portion of the inlet (13) of the body (10), the snap ring (50) having through-holes (51) formed at the both sides thereof, the through-holes (51) being faced to each other.

4. A pipe fixing system according to claim 1, wherein a packing retaining part (16) and a locking protrusion part (17) are formed between the stepped part (11) at the inside of the body (10) and the jaw-coupling cylindrical plate spring member (30) in such a manner that a packing (60) having an X-shaped section is inserted into the packing retaining part

(16) and a support ring member (70) is locked to the locking protrusion part (17), the support ring member (70) being closely contacted with the packing (60).

5. A pipe fixing system according to claim 4, wherein the support ring member (70) has a flat rectangular section, takes a ring-like shape by rolling in two rows, and has free both end portions (410) in such a manner as to be expanded and contracted in an outer diameter thereof.

6. A pipe fixing system comprising:
a body (10) provided with a stepped part (11) formed on the lower portion of the inside thereof for stopping the movement of the end of a pipe (1) and with a tapered inner peripheral surface (12) having a diameter gradually narrowed toward the outer side thereof from the inner side thereof;
a plurality of jaws (200) adapted to be guided to the tapered inner peripheral surface (12) of the body (10) in such a manner as to be moved toward an inlet (13) of the body (10) and fastened in a central direction with respect to the pipe (1) to serves as wedges in such a manner that the plurality of jaws (20) are interposed between the tapered inner peripheral surface (12) of the body (10) and the outer peripheral surface of the pipe (1);
a single cylindrical plate spring member (300) mounted at the inside of the body (10) in such a manner as to be supported at the lower end portion (310) thereof by the inner bottom surface (14) of the body (10), the single cylindrical plate spring member (300) being provided with a plurality of cut lines (320) formed vertically from the portion separated by a given distance from the lower end portion (310) thereof to the middle portion thereof in such a manner as to be equally spaced at relatively narrow intervals in a circumferential direction thereof and with a plurality of elastic piece parts (330) each formed of a plate-like shape and each disposed between the adjacent two cut lines (320) in such a manner as to be bent outwardly to provide an elastic force toward the upper portion thereof; and
a horizontal level-maintaining ring member (400) mounted into a ring-insertion groove part (220) formed in the inner peripheral surface of each of the plurality of jaws (200) in such a manner as to be face-contacted with the top end periphery of the single cylindrical plate spring member (300) and have an elastic force supplied from the single cylindrical plate spring member (300), for maintaining the plurality of jaws (200) at a horizontal level.

7. A pipe fixing system according to claim 6, wherein the single cylindrical plate spring member (300) further includes a plurality of middle cut lines (350) formed to a relatively short length along a longitudinal direction thereof between the adjacent two elastic piece parts (330), for facilitating bending effect of the middle portions of the elastic piece parts (330).

8. A pipe fixing system according to claim 6, wherein the horizontal level-maintaining ring member (400) has a flat rectangular section, takes a ring-like shape by rolling in two rows, and has free both end portions (410) in such a manner as to be expanded and contracted in an outer diameter thereof to have the same shape and function as the horizontal level-maintaining ring member (400).

9. A pipe fixing system according to claim 6, wherein a snap ring (50) is adapted to be inserted into a ring groove part (15)
formed along the inner peripheral portion of the inlet (13) of the body (10), the snap ring (50) having through-holes (51) formed at the both sides thereof, the through-holes (51) facing each other.

10. A pipe fixing system according to claim 6, wherein a packing retaining part (16) and a locking protrusion part (17) are formed between the stepped part (11) at the inside of the body (10) and the single cylindrical plate spring member (300) in such a manner that a packing (60) having an X-shaped section is inserted into the packing retaining part (16) and a support ring member (70) having the same shape and function as the horizontal level-maintaining ring member (400) is locked to the locking protrusion part (17), the support ring member (70) being in close contact with the packing (60).

* * * * *